US009665887B2

(12) United States Patent
Raina et al.

(10) Patent No.: US 9,665,887 B2
(45) Date of Patent: May 30, 2017

(54) GIFT MESSAGING BASED CUSTOMER ACQUISITION

(71) Applicant: RNCommerce, Inc., Milpitas, CA (US)

(72) Inventors: Neil Raina, Milpitas, CA (US); Robert Keith Giglio, Moraga, CA (US); Anoop Gantayat, Milpitas, CA (US)

(73) Assignee: RNCommerce, Inc., Fremont, CA (US)

( * ) Notice: Subject to any disclaimer, the term of this patent is extended or adjusted under 35 U.S.C. 154(b) by 251 days.

(21) Appl. No.: 14/520,652

(22) Filed: Oct. 22, 2014

(65) Prior Publication Data

US 2015/0039433 A1 Feb. 5, 2015

Related U.S. Application Data

(63) Continuation-in-part of application No. 13/951,473, filed on Jul. 26, 2013, now abandoned.

(51) Int. Cl.
*G06Q 30/00* (2012.01)
*G06Q 30/02* (2012.01)
*G06Q 20/38* (2012.01)
*H04L 12/58* (2006.01)

(52) U.S. Cl.
CPC ....... *G06Q 30/0257* (2013.01); *G06Q 20/387* (2013.01); *H04L 51/24* (2013.01); *H04L 51/32* (2013.01)

(58) Field of Classification Search
None
See application file for complete search history.

(56) References Cited

U.S. PATENT DOCUMENTS

| 5,513,117 A | 4/1996 | Small |
| 7,945,634 B1 | 5/2011 | Huda |
| 7,958,060 B1 | 6/2011 | Miner |
| 8,046,266 B1 | 10/2011 | Geller |
| 2004/0024639 A1 | 2/2004 | Goldman |
| 2007/0038716 A1* | 2/2007 | Saguy .................... G06Q 30/02 709/206 |
| 2008/0109306 A1* | 5/2008 | Maigret ................. G06F 21/10 705/14.46 |
| 2008/0288352 A1 | 11/2008 | Fogel |

(Continued)

OTHER PUBLICATIONS

Constine, Josh, "Yahoo Shuts Down Mail Classic, Forces Switch to New Version That Scans Your Emails to Target Ads," TechCrunch, Jun. 2, 2013.

*Primary Examiner* — Meredith A Long
(74) *Attorney, Agent, or Firm* — Law Office of Edouard Garcia

(57) ABSTRACT

In accordance with some of the gift messaging based customer acquisition methods, apparatus, and computer-readable media that are described herein, a message for a gift recipient is determined in connection with a gift based on input from a first network node associated with a gift giver. A message notification that includes access information for accessing the gift message is generated. The access information is associated with the message. A request that includes the access information is received from a second network node associated with the gift recipient. Responsive to the request, the message is transmitted to the second network node based on the association between the access information and the message, and auxiliary customer acquisition information is transmitted to the second network node.

10 Claims, 9 Drawing Sheets

(56) References Cited

U.S. PATENT DOCUMENTS

| | | | |
|---|---|---|---|
| 2009/0171739 A1* | 7/2009 | De | G06Q 30/00 |
| | | | 705/14.5 |
| 2009/0192928 A1 | 7/2009 | Abifaker | |
| 2009/0281794 A1 | 11/2009 | Ben-Haroush | |
| 2010/0004935 A1 | 1/2010 | Wain | |
| 2010/0138506 A1* | 6/2010 | Van | G06Q 30/02 |
| | | | 709/206 |
| 2010/0250372 A1 | 9/2010 | Smith | |
| 2011/0047039 A1 | 2/2011 | Crames | |
| 2011/0153462 A1 | 6/2011 | Granich | |
| 2012/0316975 A1 | 12/2012 | Schorr | |
| 2013/0018726 A1 | 1/2013 | Ionescu | |
| 2013/0030945 A1 | 1/2013 | Polt | |
| 2013/0096715 A1 | 4/2013 | Chung | |
| 2013/0132169 A1 | 5/2013 | Dooley | |
| 2013/0173424 A1 | 7/2013 | Kwon | |
| 2013/0218701 A1* | 8/2013 | Challa | G06Q 30/0215 |
| | | | 705/26.1 |
| 2013/0226728 A1* | 8/2013 | Oghittu | G06Q 30/0621 |
| | | | 705/26.5 |
| 2013/0246136 A1 | 9/2013 | Ramsey | |
| 2013/0346337 A1 | 12/2013 | O'Donnell | |
| 2014/0207610 A1* | 7/2014 | Erez | G06Q 30/0633 |
| | | | 705/26.7 |
| 2016/0098754 A1 | 4/2016 | Marino | |

\* cited by examiner

GIFT MESSAGING BASED CUSTOMER ACQUISITION

BACKGROUND

Businesses use a variety of different marketing methods to attract new customers. These marketing methods range from mass marketing campaigns that involve broadcasting marketing messages to potential customers without regard to market segment differences, to direct marketing campaigns that involve marketing directly to consumers. Mass marketing strategies reach a large audience of potential customers but are relatively inefficient in converting potential customers into actual customers, whereas direct marketing campaigns reach only a relatively small number of potential customers but are much more effective in converting potential customers into actual customers.

The first step in developing an effective direct marketing campaign is to define the target market for the campaign. Oftentimes, however, the target market of a campaign is difficult and expensive to determine. For example, the development of a well-defined target market typically requires personal information, such as the preferences and habits of potential customers, which typically is not readily available. Oftentimes such information is obtained through expensive, labor-intensive in-person interviews, online surveys, and the like.

Some businesses provide electronic gifting services that allow customers to purchase gifts for delivery to respective recipients. Such gifting services provide opportunities for these businesses to obtain information about potential customers (the gift recipients) with little cost or effort. This information, however, oftentimes is limited to gifting transaction information, such as names and addresses of the customers and the gift recipients and details regarding the delivery of the gifts. Such information typically is not sufficient for launching an effective direct marketing campaign to the gift recipients. Moreover, many country, state, and municipal jurisdictions have promulgated rules and regulations that prohibit or significantly constrain the ability to use a person's personal data for direct marketing purposes without consent.

DETAILED DESCRIPTION

Figure 1:
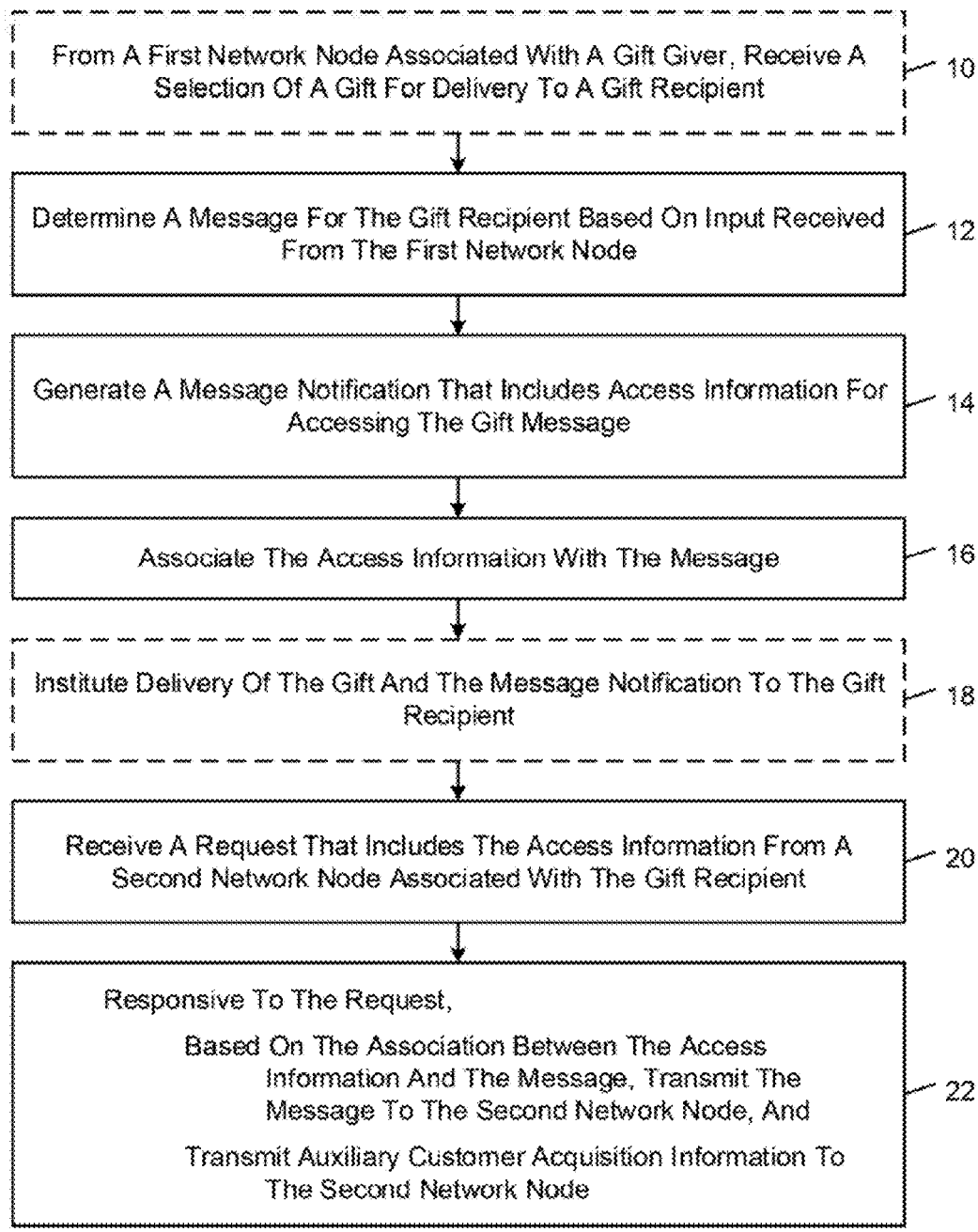
FIG. 1 is a flow diagram of an example of a method of gift messaging based customer acquisition.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale. In the drawings, dashed lines indicated optional features of the disclosed example.

I. Definition of Terms

A "product" is any tangible or intangible good or service that is available for purchase or use.

"Product purchase information" is information related to the purchase of a product. Product purchase information includes, for example, purchase confirmations (e.g., receipts), product order information (e.g., merchant name, order number, order date, product description, product name, product quantity, product price, sales tax, shipping cost, and order total), and product shipping information (e.g., billing address, shipping company, shipping address, estimated shipping date, estimated delivery date, and tracking number).

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" (also referred to herein as "memory") refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, and optical discs, such as DVD-ROM/RAM and CD-ROM/RAM.

A "network node" (also referred to simply as a "node") is a physical junction or connection point in a communications network. Examples of network nodes include, but are not limited to, a terminal, a computer, and a network switch. A "server node" is a network node that responds to requests for information or service. A "client node" is a network node that requests information or service from a server node.

A "network resource" is anything that can be accessed over a network, including a network node, an electronic document, an image, a source of information, a service, operators and operands of a mathematical equation, classes, properties, numeric values, and a collection of other resources.

A Uniform Resource Identifier (URI) is a string of characters that identifies a network resource.

A "Universally Unique Identifier" (UUID; also referred to as a "globally unique identifier," or GUID) is a number that is used to uniquely identify an object in a computer system or on a network (e.g., the internet). A UUID is generated without requiring a centralized service or authority to administer. Depending on the specific mechanism used to generate a universally unique identifier, the UUID either is guaranteed to be different or is at least extremely likely to be different from any other UUID.

A "link" refers to an object (e.g., a piece of text, an image or an area of an image) that loads a hypertext link reference into a target window when selected. A link typically includes an identifier or connection handle (e.g., a uniform resource identifier (URI)) that can be used to establish a network connection with a communicant, resource, or service on a network node.

As used herein, the term "web page" refers to any type of resource of information (e.g., a document, such as an HTML or XHTML document) that is suitable for the World Wide Web and can be accessed through a web browser. A web page typically contains information, graphics, and hyperlinks to other web pages and files. A "web site" includes one or more web pages that are made available through what appears to users as a single web server.

"Customer acquisition information" refers to any information relating to locating, qualifying, or securing the business of new customers. This information includes, for example, information relating to lead generation, lead acquisition, marketing information, sales information, and links to such information (e.g., hyperlinks associated with such information, and information (e.g., unique identifiers and the like) for tracking gift recipients).

As used herein, the term "includes" means includes but not limited to, the term "including" means including but not limited to. The term "based on" means based at least in part on.

II. Introduction

The examples that are described herein provide systems, methods, and computer-readable media for gift messaging based customer acquisition that solve certain problems involved in developing an effective direct marketing campaign for a gift recipient in a cost effective way by leveraging a gift recipient's desire to receive a personalized gift message from an existing customer (i.e., the gift giver) to incentivize the gift recipient to receive various customer acquisition efforts, including promotions and other marketing information, and requests for personal information and consent to use such information for direct marketing purposes.

Some examples of these systems and methods are embodied in a gifting system that is embedded in a gifting process flow that allows a gift giver to purchase a gift for a gift recipient. Examples of the gifting system enable the gift giver to create a custom message for the gift recipient. After the gift is purchased, the gift is sent to the gift recipient along with a message notification that informs the gift recipient that a custom message from the gift giver can be accessed online using tracking information associated with the message notification. Upon receiving the tracking information from the gift recipient, examples of the gifting system present the custom message to the gift recipient along with auxiliary customer acquisition information that the gifting system determines is potentially relevant to the gift recipient (e.g., based on attributes of the purchased gift, the gift giver, and the gift recipient). Examples of such auxiliary customer acquisition information include promotions, cross-selling recommendations, and product registration opportunities, and opportunities for the gift recipient to indicate his or her marketing consent or preferences. In this way, the gifting system leverages the goodwill associated with the gifting experience combined with the custom message from the gift giver to make the gift recipient more receptive to the post-purchase customer acquisition efforts.

III. Gift Messaging Based Customer Acquisition

FIG. 1 shows an example of a method of gift messaging based customer acquisition that is implemented by an example of a gifting method in which a gift giver selects a gift for delivery to a gift recipient. In accordance with this method, a gifting system receives a selection of a gift for delivery to a gift recipient from a first network node associated with a gift giver (FIG. 1, block 10). Based on input received from the first network node, the gifting system determines a message for the gift recipient (FIG. 1, block 12). The gifting system generates a message notification that includes access information for accessing the gift message (FIG. 1, block 14). The gifting system associates the access information with the message (FIG. 1, block 16). The gifting system institutes delivery of the gift and the message notification to the gift recipient (FIG. 1, block 18). The gifting system receives a request that includes the access information from a second network node (FIG. 1, block 20). Responsive to the request, the gifting system transmits the message to the second network node based on the association between the access information and the message, and transmits auxiliary customer acquisition information to the second network node (FIG. 1, block 22).

The gift giver may be an existing customer of the gifting system or a new customer. In either case, the gifting system typically obtains certain personal information about the gift giver through, for example, a customer registration process or a checkout process. Examples of such personal information include contact information (e.g., name, residence address, email address, and telephone number), survey information (e.g., demographic information, interests, and preferences), and payment information. The gift giver's network node typically is an electronic data processing device, such as a desktop computer, laptop computer, tablet computer or a mobile telephone, that is capable of interfacing the gift giver with the gifting system. In some examples, the gifting system provides a user interface (e.g., a web page based interface) through which the gift giver selects the gift. Depending on the business model of the gifting system, the gift may be available for purchase or free of charge. The gift may be any type of product or service, including physical gift items, electronic gift items, service agreements, and redeemable gift instruments, such as gift cards, gift certificates, gift codes, and the like. If the gift giver is a new customer, the gifting system typically provides to the gift giver one or more input screens for receiving contact information (e.g., name, mailing address, email address, and telephone number) and optionally payment information for the gift giver. The gifting system also provides one or more screens for receiving contact information (e.g., name, shipping address, email address, and telephone number) for the gift recipient.

The gifting system provides the gift giver with the option of including a message with the gift. In general, the gift message may include any type of message content that can be stored and presented to the gift recipient at a later time, including textual content, audio content, and video content. The gift message may be a message created by the gift giver (e.g., a text message or an audio or video recording of the gift giver speaking the message) or it may be a message selected from a set generic stock messages provided by the gifting system and personalized by the gift giver. The gifting system may provide a user interface and online tools that enable the gift giver to create the gift message, customize a generic stock gift message, or upload a previously created gift message.

The message notification notifies the gift recipient of the availability of the gift message and provides instructions for accessing the gift message. The gift message may be presented in a wide variety of different message formats, including a text message printed on a physical medium, and an electronic message (e.g., an email message, an SMS text message, an audio message, and a video message) sent from a web resource or a telephony resource for presentation on a network node associated with the gift recipient.

The access information that enables the gift recipient to access the gift message typically includes tracking information. In some examples, the tracking information includes a message source identifier, such as a uniform resource identifier (URI)) of a web resource (e.g., a web site or a web page) or other identifier or code (e.g., a telephone number) of another type of resource from which gift recipient can access the gift message. The access information also typically includes a gifting transaction specific identifier that can be used to identify the gift message. In some examples, the gifting transaction specific identifier is a universally unique identifier (UUID) that the gifting system has associated with one or more elements of the gifting transaction (e.g., one or more of the gift, the gift giver, the gift recipient, and the gift message). In some of these examples, the gifting transaction specific UUID may be assigned to the message notification or the gift message. In this regard, the gifting system typically stores the gifting transaction specific UUID and one or more identifiers of the one or more elements of the gifting transaction (e.g., an identifier of the vending service from which the gift is purchased, a gift purchase transaction identifier, an order identifier, and a stock keeping unit (SKU) identifier of each product that is part of the gift) in one or more data records in a relational database. In this way, the gifting system also associates the access information with the message. The access information may be presented in a human-readable format (e.g., textual message providing instructions for accessing the gift message) or in a machine-readable format (e.g., a barcode, such as a Quick Response (QR) code) that is readable by devices that are commonly available to users (e.g., a mobile device that is equipped with a camera and barcode reading software).

In some examples, the gifting system engages a third-party shipping service to deliver a gift package containing the gift to the gift recipient. Depending on the business model of the gifting system, the gift package may include the message notification or the message notification may be delivered to the gift recipient separately from the gift package.

In examples in which the gift and the message notification are physically delivered to the gift recipient in the same gift package, the message notification typically is a text based message that is printed on a physical medium (e.g., a packing slip or other insert) that is included in or to or otherwise associated with the gift package. In some examples, the access information is included on the same physical medium as the message notification.

In examples in which the gift and the message notification are delivered separately to the gift recipient, the message notification typically is an electronic message (e.g., an email message or a Short Message Service (SMS) message) that may be presented to the gift recipient in any of a variety of different human-perceptible formats (e.g., a text, audio, or video message). In these examples, the access information may be included in the electronic message in a human-readable format (e.g., textual message providing instructions for accessing the gift message) or in a machine-readable format (e.g., a hyperlink that is associated with textual instructions to select the hyperlink, and a URI of a web resource for accessing the gift message). In some examples, the gifting system transmits the message notification to the gift recipient on a date specified by the gift giver or after confirming that the gift has been delivered to the gift recipient (e.g., based on the purchase transaction information, the gifting system can use the tracking system of the shipping service to determine the delivery status of the gift).

The gifting system typically receives the message access request that includes the access information after the gift and the message notification have been delivered. The message access request is received in accordance with the type of access information that was included with the message notification. For example, if the access information included a URI for a web resource, the message access request typically is received over an internet connection from a web browser component of the gift recipient's network node. If the access information included a telephone number, on the other hand, the message access request typically is received over a telephony connection with the gift recipient's telephony enabled network node.

In some examples, the gifting system extracts the gifting transaction specific UUID from the access information and uses the gifting transaction specific UUID to determine the gift message. In some examples, the gifting system uses the UUID as an index into a relational database to determine an identifier (e.g., a UUID) of the gift message. The gifting system then uses the identifier of the gift message to retrieve the gift message from memory storage for transmission to the gift recipient's network node for presentation to the gift recipient. The gifting system also transmits auxiliary customer acquisition information to the gift recipient's network node. The auxiliary customer acquisition information may include any type of customer acquisition information, including, for example, information relating to lead generation, lead acquisition, marketing information, sales information, and links to such information. Examples of such customer acquisition information include promotions, cross-selling recommendations, requests for acquiring personal information from the gift recipient (e.g., a product registration form that requires certain personal information in order to receive enhanced product warranties or other benefits), and opportunities to acquire the gift recipient's marketing consent or preferences. In some examples, the gifting system determines the customer acquisition information based on, for example, attributes of the gifting transaction, including the gift giver, the gift recipient, the gift, and the gift message.

Figure 2:
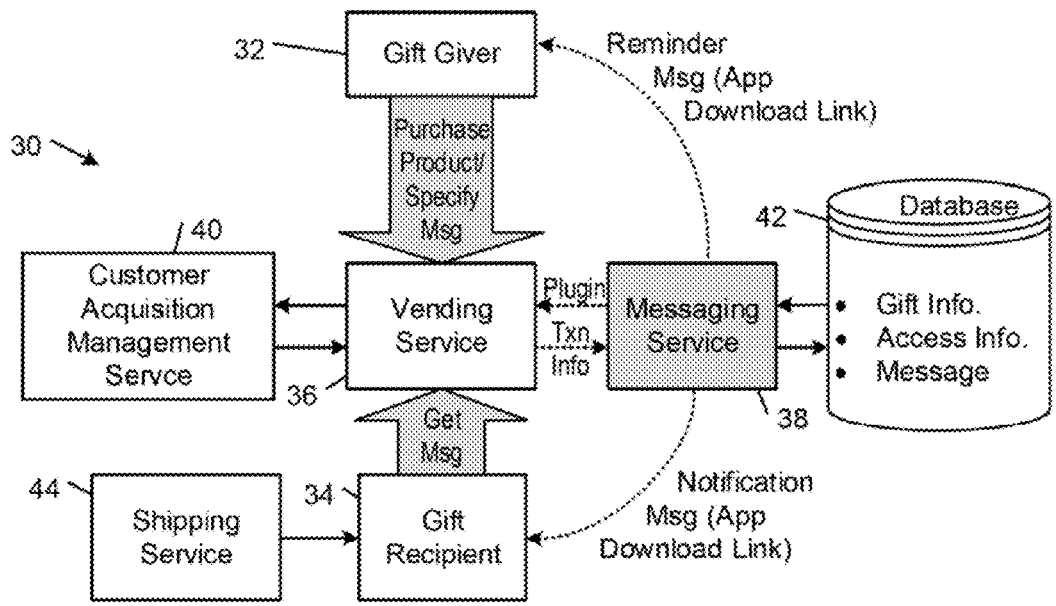
FIG. 2 is a diagrammatic view of an example of a gifting system that facilitates gift giving by a gift giver to a gift recipient.

FIG. 2 shows an example 30 of the gifting system that facilitates gift giving by a gift giver 32 to a gift recipient 34. The gifting system 30 includes a vending service 36, a messaging service 38, a customer acquisition service 40, and a database 42 that associates the gifting transaction specific identifier with information about the gift purchase transaction (e.g., retailer identifier, purchase transaction identifier, order identifier, and SKUs for each individual product). In other examples, the messaging service 38 and the database 42 are components of the gifting system, whereas the vending service 36 and the customer acquisition service 40 are components of a separate entity (e.g., an online retailer, such as Amazon.com, Inc., Apple, Inc., Barnes & Nobel, Inc., and Wal-mart.com USA, LLC.) that is referred to herein as a "vendor." In these examples, the vendor leverages the messaging and database services of the gifting system through application programming interfaces (APIs) that are published by the gifting system. In some of these examples, the vendor performs the first receiving step (FIG. 1, block 10) of the gift messaging based customer acquisition method of FIG. 1, and the gifting system performs the remaining steps of the method (FIG. 1, blocks 12-22). In other examples, the vendor performs the first receiving step and the instituting step (FIG. 1, blocks 10 and 18) of the gift messaging based customer acquisition method of FIG. 1, and the gifting system performs the remaining steps of the method (FIG. 1, blocks 12-16 and 20-22). In examples in which the gifting system 30 consists of the messaging service 38 and the database 43, gifting system 30 typically interacts with the gift giver 32 and the gift recipient 34 via a web widget or other plugin in association with a network resource (e.g., a web page) that is affiliated with the vendor.

Figure 3:
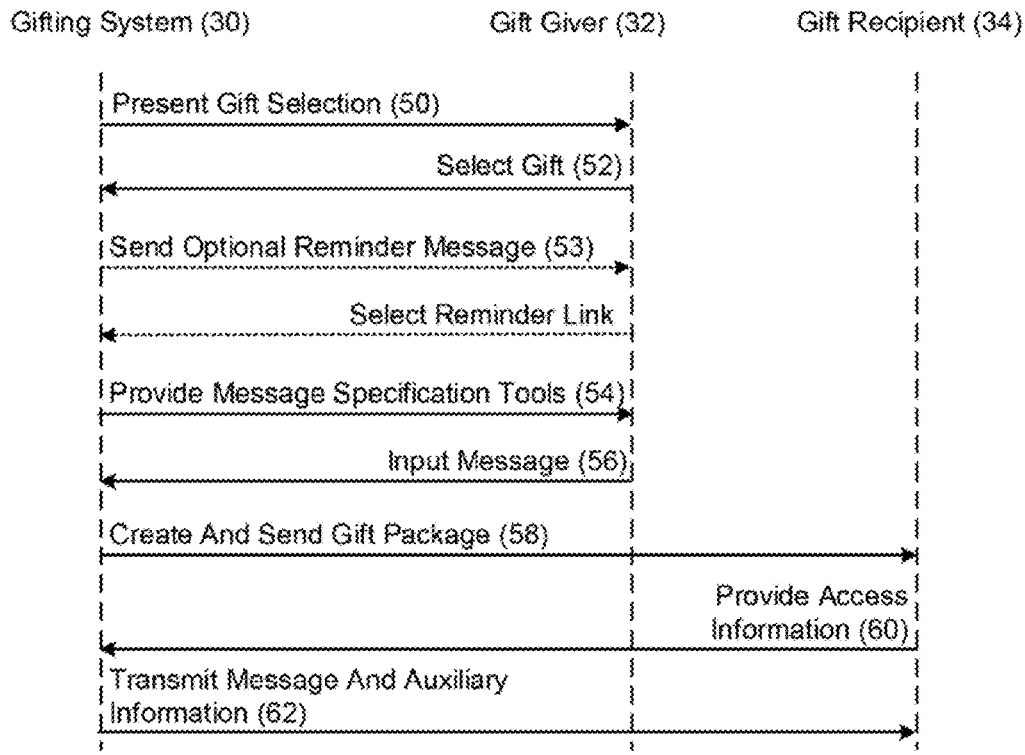
FIG. 3 is a sequence diagram showing examples of interactions between the gifting system, the gift giver, and the gift recipient of FIG. 2.

FIG. 3 shows exemplary interactions between an example of the gifting system 30, the gift giver 32, and the gift recipient 34 of FIG. 2. In accordance with this example, the gifting system 30 presents a gift selection to the gift giver 32 (step 50). The gift giver 32 selects a gift for delivery to a designated gift recipient 34 (step 52). The gifting system 30 also provides the gift giver 32 with a deferrable option to specify a gift message for the gift recipient. The gift giver 32 may specify the gift message in connection with the purchase transaction (e.g., during the checkout process flow or after order confirmation). Alternatively, the gift giver 32 may elect to defer specifying the gift message to a later time. If the gift giver 32 selects the message specification deferment option, the gifting system 30 prompts the gift giver 32 to provide his or her contact information for receiving a reminder message that invites the gift giver to specify a gift message for the gift recipient. After confirmation that the gift purchase transaction has been completed, the gifting system 30 uses the contact information to send the gift giver 32 a reminder message that includes a link to a network resource for specifying the gift message (step 53). Either in connection with the purchase transaction or after the gift giver 32 selects the link in the reminder message (step 53), the gifting system 30 provides the gift giver 32 with one or more message specification tools (step 54). Using the message specification tools, the gift giver 32 can, for example, create a gift message, modify a preexisting (e.g., stock) gift message, or upload a gift message (step 56). In the illustrated example, the gifting system 30 creates a gift package that contains a notification message that informs the gift recipient of the availability of the gift message and includes access information that enables the gift recipient 34 to access the gift message, and engages a third-party shipping service 44 (see FIG. 2) to deliver the gift package to the gift recipient 34 (step 58). In other examples, the gifting system 30 sends the notification message separately from the gift package (e.g., in an electronic message addressed to a electronic mail, text, or facsimile messaging account of the gift recipient). In some examples, the notification message is sent to the gift recipient after the gifting system 30 receives confirmation that the gift package has been delivered to the gift recipient 34. In some examples (e.g., when the gift giver 32 decides to cancel the message or the retailer cannot fulfill the order, such as when the gift is unavailable or payment for the gift failed authorization), the vendor sends the messaging service 38 a cancellation message instructing the messaging service 38 to cancel the gift message. Depending on when the cancellation message is received by the messaging service 38, the messaging service 38 either may omit sending the reminder message inviting the gift giver 32 to create the gift message or omit sending the notification message inviting the gift recipient 34 to access the gift message. After receiving the notification message, the gift recipient 34 provides the access information to the gifting system 30 (step 60). In response to receipt of the access information, the gifting system 30 transmits the gift message and the auxiliary customer acquisition information to the gift recipient 34 (step 62).

In the methods described herein, the gifting system 30 leverages the gift messaging service to generate multiple opportunities ("touch points" on the consumers' purchase decision paths) for the vendor to, for example, promote products to or obtain marketing consent from the gift giver 32 and the gift recipient 34. For example, by providing the deferrable message specification option that allows the gift giver 32 to defer the specification of the gift message to a later time, the gifting system 30 not only provides a convenience to a gift giver who does not currently have the time or interest to specify the gift message during the purchase transaction, but also generates another opportunity for the vendor to reengage the gift giver with additional customer acquisition efforts. Furthermore, in addition to reminding the gift giver 32 to specify a gift message, the reminder message also may include a link to install on the gift giver's communication device an application (also referred to as an "app") that is affiliated with the vendor and provides access to one or more network resources of the vendor for the gift giver 32 to, for example, specify the gift message, purchase additional products, and view product promotions and other customer acquisition information. A similar application installation link also may be incorporated in the notification message that is sent to the gift recipient 34 to provide access to one or more network resources of the vendor for the gift recipient 34 to, for example, view the gift message, purchase products, and view product promotions and other customer acquisition information.

Figure 4:
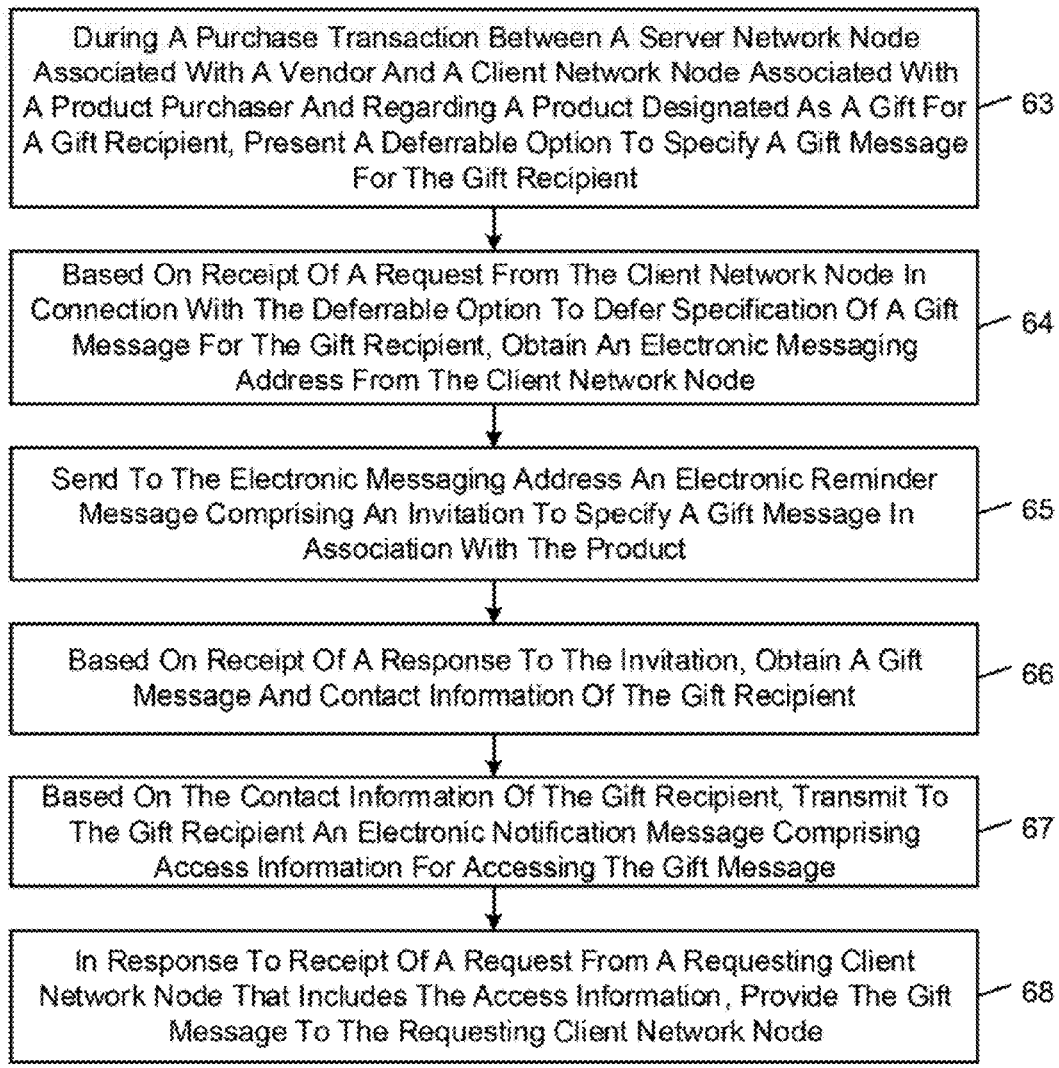
FIG. 4 is a flow diagram of an example of a method of gift messaging based customer acquisition.

FIG. 4 shows an example of a method of gift messaging based customer acquisition. This method typically is performed by at least one server node of the gifting system 30. In accordance with this method, during a purchase transaction between a server network node associated with a vendor and a client network node associated with a product purchaser and regarding a product designated as a gift for a gift recipient, a deferrable option to specify a gift message for the gift recipient is presented (FIG. 4, block 63). Based on receipt of a request from the client network node in connection with the deferrable option to defer specification of a gift message for the gift recipient, an electronic messaging address is obtained from the client network node (FIG. 4, block 64). An electronic reminder message that includes an invitation to specify a gift message in association with the product is sent to the electronic messaging address (FIG. 4, block 65). Based on receipt of a response to the invitation, a gift message and contact information of the gift recipient are obtained (FIG. 4, block 66). Based on the contact information of the gift recipient, an electronic notification message that includes access information for accessing the gift message is transmitted to the gift recipient (FIG. 4, block 67). In response to receipt of a request from a requesting client network node that includes the access information, the gift message is provided to the requesting client network node (FIG. 4, block 68).

In some examples, in response to receipt of the request from the client network node in connection with the deferrable option (FIG. 4, block 64), the gifting system 30 associates a universally unique identifier (UUID) with the purchase transaction. The gifting system typically includes the UUID in the invitation to specify the gift message for incorporation in the response to the invitation. This allows the gifting system 30 to extract the UUID from the response to the invitation. Based on the UUID extracted from the response the invitation, the gifting system 30 typically associates the gift message with the purchase transaction.

In some examples, the process of obtaining the gift message specification from the gift giver includes supplying the gift giver with a network resource (e.g., a web page) for specifying the gift message. In some of these examples, the response to the invitation to specify the gift message includes the gifting transaction specific identifier and information about the gift purchase transaction (e.g., retailer identifier, purchase transaction identifier, order identifier, and SKUs for each individual product) is obtained from the database 42 based on the association between the gifting transaction specific identifier and the gift purchase transaction information. In some of these examples, the gifting transaction specific identifier is embedded in a network resource link that is incorporated in the reminder message that is sent to the gift giver. The gifting transaction specific identifier then may be used in a database lookup to determine the gift purchase transaction information. In some examples, the network resource is customized for the gift giver based on the purchase transaction information. For example, marketing communications may be selected based on the determined purchase transaction information and incorporated into the network resource that is presented to the gift giver.

In some examples, the access information in the gift message notification that is sent to the gift recipient includes a link that incorporates a URI of a network resource (e.g., a web page) that is affiliated with the vendor and an identifier (UUID) that is specific to the gifting transaction. Selection of the link causes the gift giver's client network node (communication device) to navigate to the network resource via the URI. Based on the gifting transaction specific identifier, the gifting system identifies the gift message and configures the network resource to present interface controls for accessing. The gifting transaction specific identifier also may be used in a database lookup to determine the gift purchase transaction information. In some examples, the network resource is customized for the gift recipient based on the purchase transaction information. For example, marketing communications may be selected based on the determined purchase transaction information and incorporated into the network resource that is presented to the gift recipient.

Figure 5:
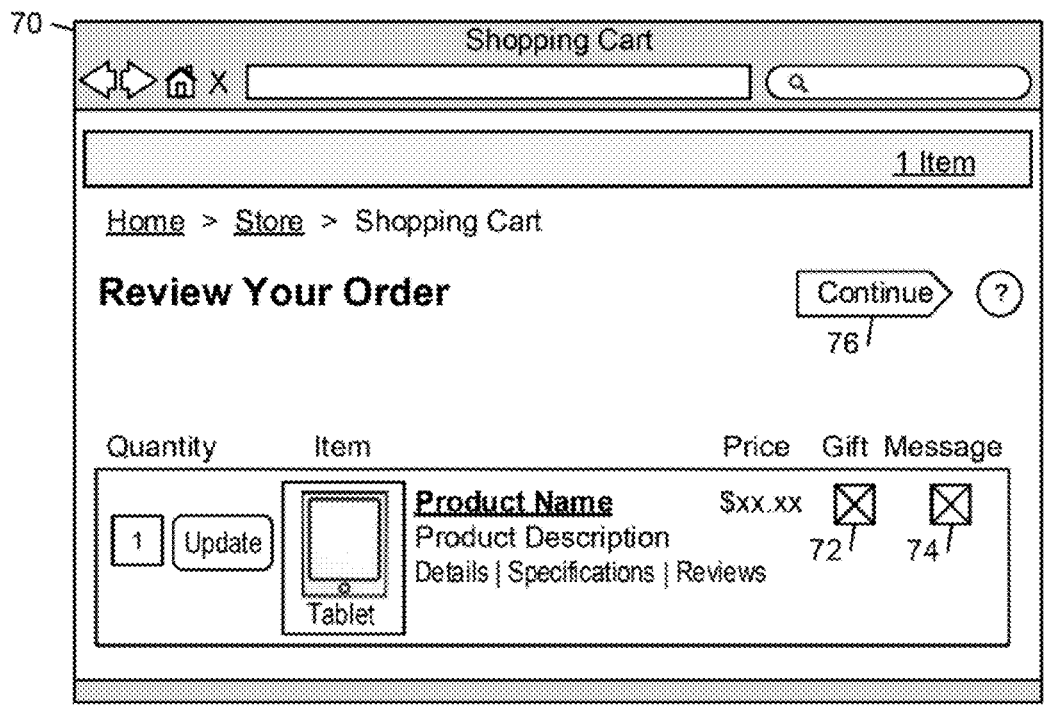
FIG. 5 is a diagrammatic view of an example of a network resource presenting a user interface for purchasing a gift and designating the purchase as a gift.

FIG. 5 shows an example of a shopping cart interface 70 that the gifting system 30 may present to the gift giver 32 in the process of purchasing an item and designating the item as a gift. In this process, the gift giver 32 typically accesses an online web site administered by the vending service 36, browses various web pages of the web site presenting items that are available for sale, and adds one or more items to an electronic shopping cart that is associated with the gift giver 32. When the gift giver 32 is ready to confirm the purchase of the one or more items, the user selects a "View Cart" button or the like and the gifting system 30 presents the shopping cart interface 70. The shopping cart interface 70 allows the gift giver 32 to review the items in the electronic shopping cart, update the quantities of those items, designate one or more of the items as gift items, and indicate whether a message should be included with the gift item. In the example illustrated in FIG. 5, the gift giver 32 has selected a tablet computer for purchase, selected a "Gift" option 72 to designate the item as a gift, and selected a "Message" option 74 to indicate that a message should be included with the gift.

After completing the shopping cart review page, the gift giver 32 may select a "Continue" button 76 to proceed to a gift delivery specification page (not shown), which allows the gift giver 32 to enter contact information for the gift recipient 34 (e.g., name, shipping address, email address, and telephone number), select a delivery method, and provide other delivery related information and preferences.

Figure 6:
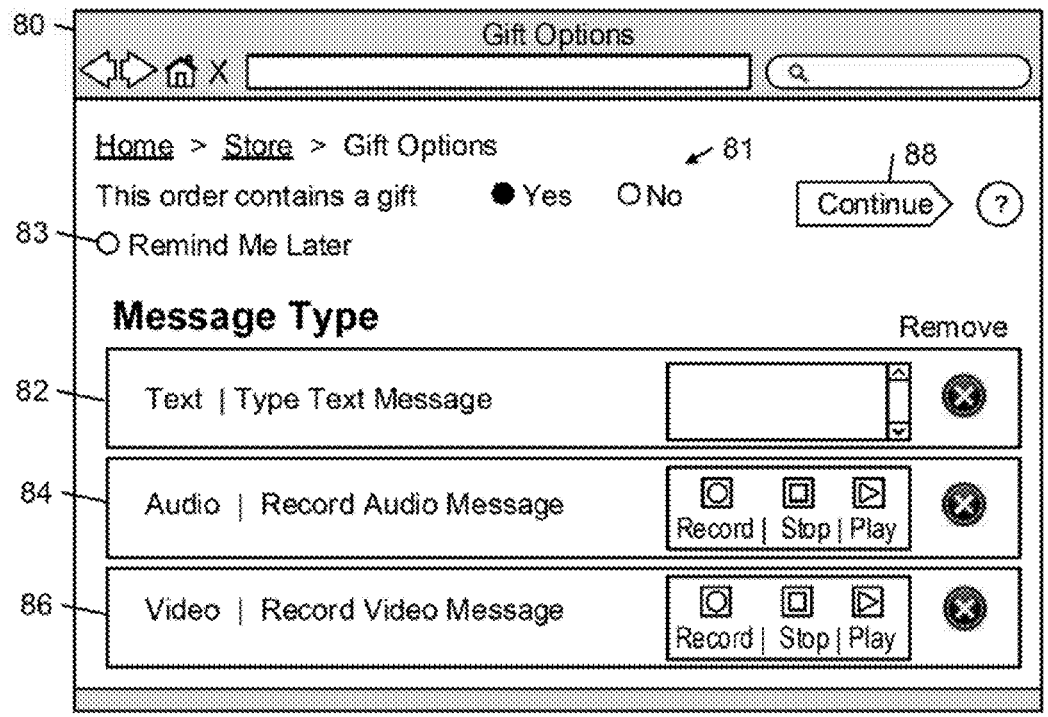
FIG. 6 is a diagrammatic view of an example of a network resource presenting a user interface for selecting gift options and specifying a message for a gift recipient.

Referring to FIG. 6, after completing the gift delivery specification page, the gifting system 30 presents a gift options interface 80 to the gift giver 32. The gift options interface 80 allows the gift giver 32 to indicate 81 whether or not the order contains a gift and to select an option 83 to defer specification of the gift message to a later time. The gift options interface 80 also provides the gift giver 32 with online tools 82, 84, and 86 for creating one or more messages that will be available to the give recipient 34 after the gift has been delivered. In the illustrated example, the gift options interface 80 includes tools for creating one or more of a text message, an audio message, and a video message. In some examples, the gifting system 30 receives textual, audio, and video input from the gift giver 32 through an interface with a client application (e.g., a web browser or a customized application or browser plugin provided by the gifting system 30) executing on a client node of the gift giver 32. The client application interacts with hardware components of the client node (e.g., a keyboard, microphone, and camera) to obtain the inputs from the gift giver 32 that are transmitted to the gifting system 30 for incorporation into the give message.

Figure 7:
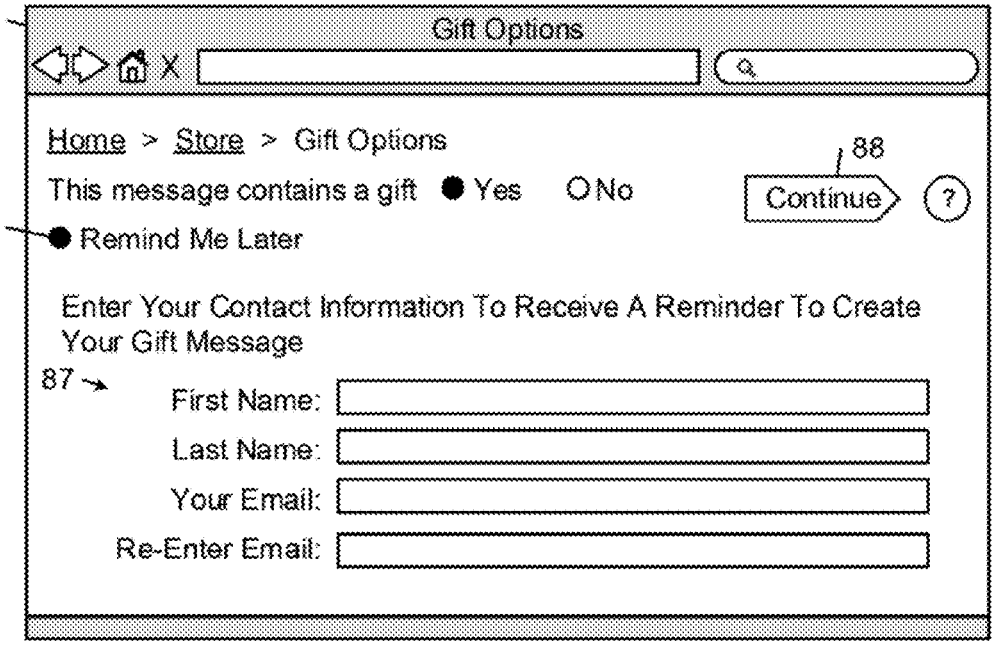
FIG. 7 is a diagrammatic view of an example of a network resource presenting a user interface for deferring specification of a gift message.

Referring to FIG. 7, in response to the gift giver's selection of the gift message specification deferment ("remind me later") option 81, gifting system 30 replaces the message creation tools 82-84 with a contact information form 87 that allows the user to enter his or her contact information (e.g., First Name, Last Name, and electronic mail address), which will be used by the gifting system 30 to send a reminder message inviting the gift giver 32 to specify a gift message for the gift recipient.

After completing the gift options page 80, the gift giver 32 may select a "Continue" button 88 to proceed to one or more payment pages that allow the gift giver 32 to provide payment information and confirm payment for purchasing the gift item. Examples of such payment information include contact information for the gift giver 32 (e.g., name, address, and telephone number), payment method, and payment details (e.g., credit card number and security code). During the payment process, the gift giver 32 typically is given an option to accept certain terms and conditions regarding the gift, delivery of the gift, payment, and use of the give giver's personal data for direct marketing purposes.

In the example illustrated in FIGS. 5-7, the gift messaging process is incorporated into a checkout process flow at a point before the gift giver 32 purchases the gift item. In other examples, the gift messaging process occurs after the checkout process has completed. In still other examples, the gift is available free of charge and the gifting system 30 performs the gift messaging process without requiring the gift giver 32 to proceed through the payment process flow. In general, the gift messaging process provided by the gifting system 30 is applicable to any transfer of goods from the gift giver 32 and the gift recipient 34.

If the gift giver 32 has selected the gift message specification deferment ("remind me later") option 81 and entered his or her contact information in the contact information form 87, the gifting system 30 will send the gift giver 32 a reminder message after the purchase transaction has completed.

Figure 8:
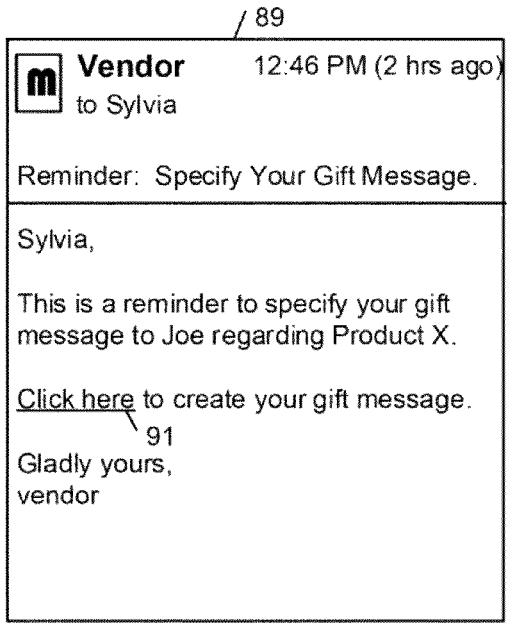
FIG. 8 is a diagrammatic view of an example of a reminder message.

FIG. 8 shows an example of a reminder message 89 (e.g., an electronic mail message) that is addressed to the specified messaging account of the gift giver 32 (Sylvia). In some examples, the reminder message 89 is generated automatically from a standard form containing variable data fields that are populated with values that are extracted from the purchase transaction information that the gifting system 30 has associated with the gifting transaction specific identifier. Examples of such extracted information include the gift giver's name (Sylvia), the vendor's name (Merchant), the gift recipient's name (Joe), and the name of the gift product (Product X). The reminder message 89 also includes a link 91 to a network resource that is affiliated with the vendor for specifying the gift message. In some examples, the link includes a URI and the gifting transaction specific identifier. When selected, this type of link causes a web browser application installed on the gift giver's communication device to navigate to the network resource identified by the URI and to pass the gifting transaction specific identifier to a server network node associated with the network resource. In other examples, the link includes an application-specific identifier and the gifting transaction specific identifier. An example of such a link is amazon://giftpixel?id=12412124, where "amazon://" identifies an application affiliated with the vendor Amazon.com, "giftpixel" identifies a type of network resource on which present the gift message creation tools, and "12412124" is a UUID of the gift message that will be created. When selected, this type of link causes the gift giver's communication device to attempt to open a vendor specific application affiliated with the vendor on the gift giver's communication device. If the vendor specific application already is installed, the gift giver's communication device opens the vendor specific application. The vendor specific application then navigates to a URI associated with the vendor. The vendor opens a network resource of the appropriate type to present the message creation tools. If the vendor specific application is not installed, the link will cause the gift giver's communication device to navigate to an online resource (e.g., an app store) to download and install the vendor specific application on the gift giver's communication device.

Figure 9:
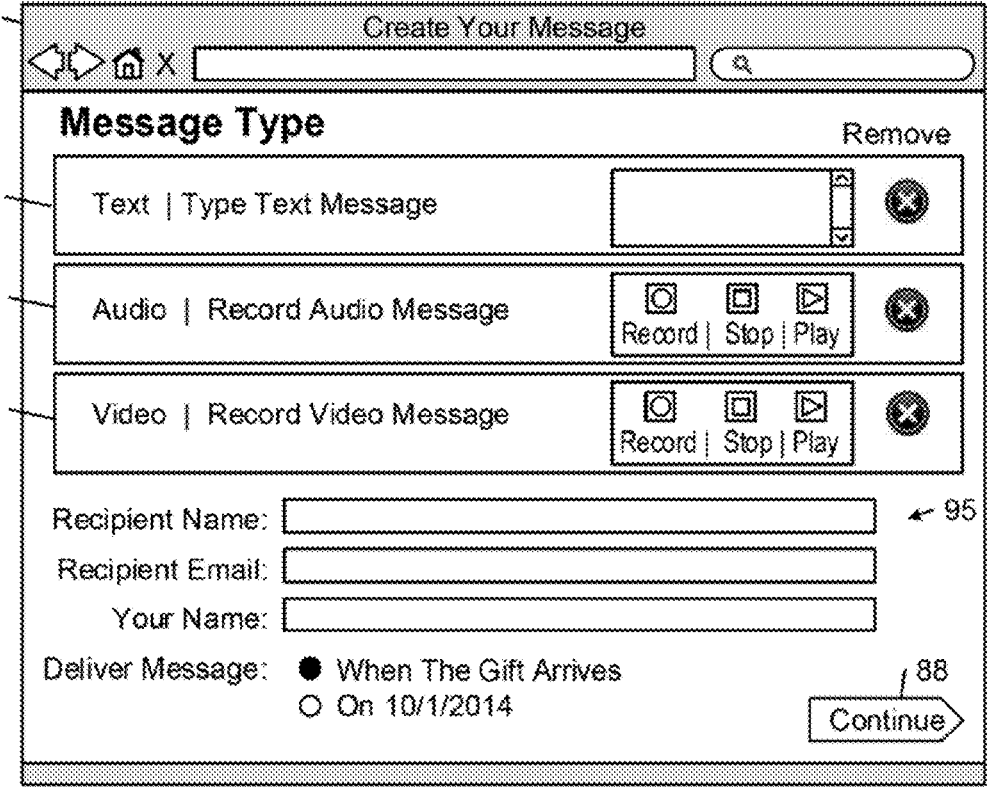
FIG. 9 is a diagrammatic view of an example of a network resource presenting a user interface for specifying a gift message for a gift recipient.

FIG. 9 shows an example of a network resource 93 (e.g., a web page) that is presented to the gift giver after the gift giver selects the link 91 in the reminder message 89. In addition to presenting the message creation tools 82-86 for creating the gift message, the network resource 93 also provides a contact information form 95 that allows the user to enter the gift recipient's contact information (e.g., First Name, Last Name, and electronic mail address), which will be used by the gifting system 30 to send a notification message informing the gift recipient of the availability of the gift message. The gift giver also may specify whether the notification message should be delivered when the gift is delivered or on a particular date selected by the gift giver.

After the gift giver 32 has specified the gift message, the gifting system 30 sends the notification message to the gift recipient 34 at the designated time (e.g., when the gift is delivered or on the designated date).

Figure 10:
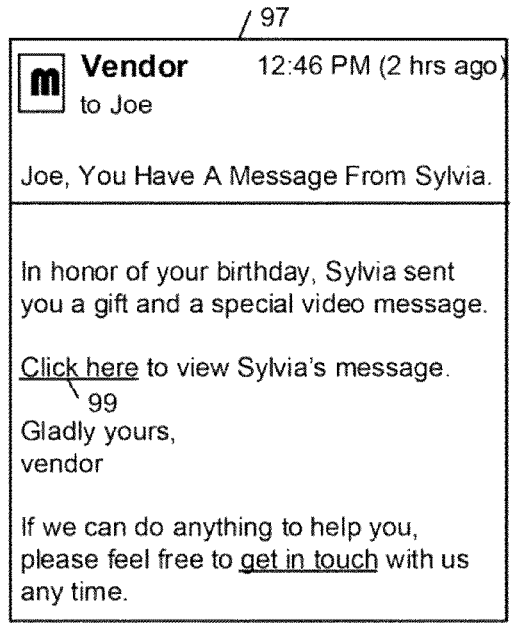
FIG. 10 is a diagrammatic view of an example of a gift message.

FIG. 10 shows an example of a gift message 97 (e.g., an electronic mail message) that is addressed to the specified messaging account of the gift recipient 34 (Neil). In some examples, the gift message 97 is generated automatically from a standard form containing variable data fields that are populated with values that are extracted from the purchase transaction information that the gifting system 30 has associated with the gifting transaction specific identifier. Examples of such extracted information include the gift giver's name (Sylvia), the vendor's name (Merchant), the gift recipient's name (Joe), and the name of the gift product (Product X). The gift message 97 also includes a link 99 to a network resource that is affiliated with the vendor for accessing the gift message. In some examples, the link includes a URI and the gifting transaction specific identifier. When selected, this type of link causes a web browser application installed on the gift recipient's communication device to navigate to the network resource identified by the URI and to pass the gifting transaction specific identifier to a server network node associated with the network resource. In other examples, the link includes an application-specific identifier and the gifting transaction specific identifier. An example of such a link is amazon://giftpixel?id=12412124, where "amazon://" identifies an application affiliated with the vendor Amazon.com, "giftpixel" identifies a type of network resource on which present the gift message, and "12412124" is a UUID of the gift message. When selected, this type of link causes the gift recipient's communication device to attempt to open a vendor specific application affiliated with the vendor on the gift recipient's communication device. If the vendor specific application already is installed, the gift recipient's communication device opens the vendor specific application. The vendor specific application then navigates to a URI associated with the vendor. The vendor opens a network resource of the appropriate type to present the gift message. If the vendor specific application is not installed, the link will cause the gift recipient's communication device to navigate to an online resource (e.g., an app store) to download and install the vendor specific application on the gift recipient's communication device.

After the gift recipient 34 has received the gift notification, the gift recipient 34 is able to use the access information to receive the gift message from the gifting system 30. In this process, the gift recipient 34 transmits the access information to the gifting system 30. The gifting system 30 uses the access information to retrieve the gift message from memory and present the gift message to the gift recipient 34 along with auxiliary customer acquisition information (e.g., promotions, cross-selling recommendations, and opportunities for acquiring personal information from the gift recipient 34) that has been determined as being potentially relevant to the gift recipient 34.

Figure 11:
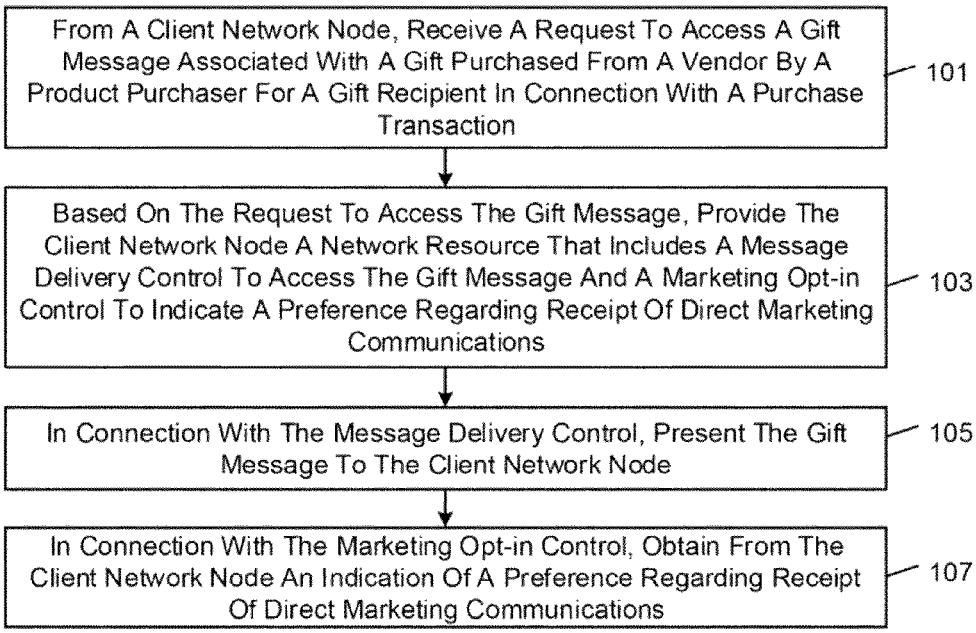
FIG. 11 is a flow diagram of an example of a method of gift messaging based customer acquisition.

FIG. 11 shows an example of a method of gift messaging based customer acquisition that is performed after the gift recipient receives the notification message. This method typically is performed by at least one server node of the gifting system 30. In accordance with this method, a request is received from a client network node to access a gift message associated with a gift purchased from a vendor by a product purchaser for a gift recipient in connection with a purchase transaction (FIG. 11, block 101). Based on the request to access the gift message, the client network node is provided a network resource that includes a message delivery control to access the gift message and a marketing opt-in control to indicate a preference regarding receipt of direct marketing communications (FIG. 11, block 103). In connection with the message delivery control, the gift message is presented to the client network node (FIG. 11, block 105). In connection with the marketing opt-in control, an indication of a preference regarding receipt of direct marketing communications is obtaining from the client network node (FIG. 11, block 107).

In some examples, the network resource online gift message interface includes a gift message access web page that provides the message delivery control and the marketing opt-in control. In response to input from the client network node in connection with the message delivery control, the gift message is presented to the client network node and a marketing preference record of the preference regarding receipt of direct marketing communications indicated by the marketing consent control is generated. Information about the purchase transaction typically is determined from the request to access the gift message, and the network resource online gift message interface is customized based on the purchase transaction information. For example, the network resource online gift message interface may be customized by incorporating into the network resource online gift message interface marketing communications selected based on the purchase transaction information.

In some examples, the gift message is presented to the client network node in response to input from the client network node in connection with the message delivery control. After presenting the gift message to the client network node, the preference regarding receipt of direct marketing communications indicated by the marketing consent control is obtained and a marketing preference record of the indicated preference is generated. In some examples, in addition to recording the marketing consent or preference indicated by the gift recipient, the marketing preference record also includes information that evidences the fact that the gift recipient did in fact provide such consent. Examples of such information include the gift recipient's messaging address (e.g., the electronic mail address associated with the notification message), the time the marketing preference or consent was captured, and information about the message viewing session (e.g., a device identifier that uniquely identifies the gift recipient's network node, an Internet Protocol (IP) address of the gift recipient's network node, and a network address (URI) of the network resource on which the gift message is presented).

Figure 12:
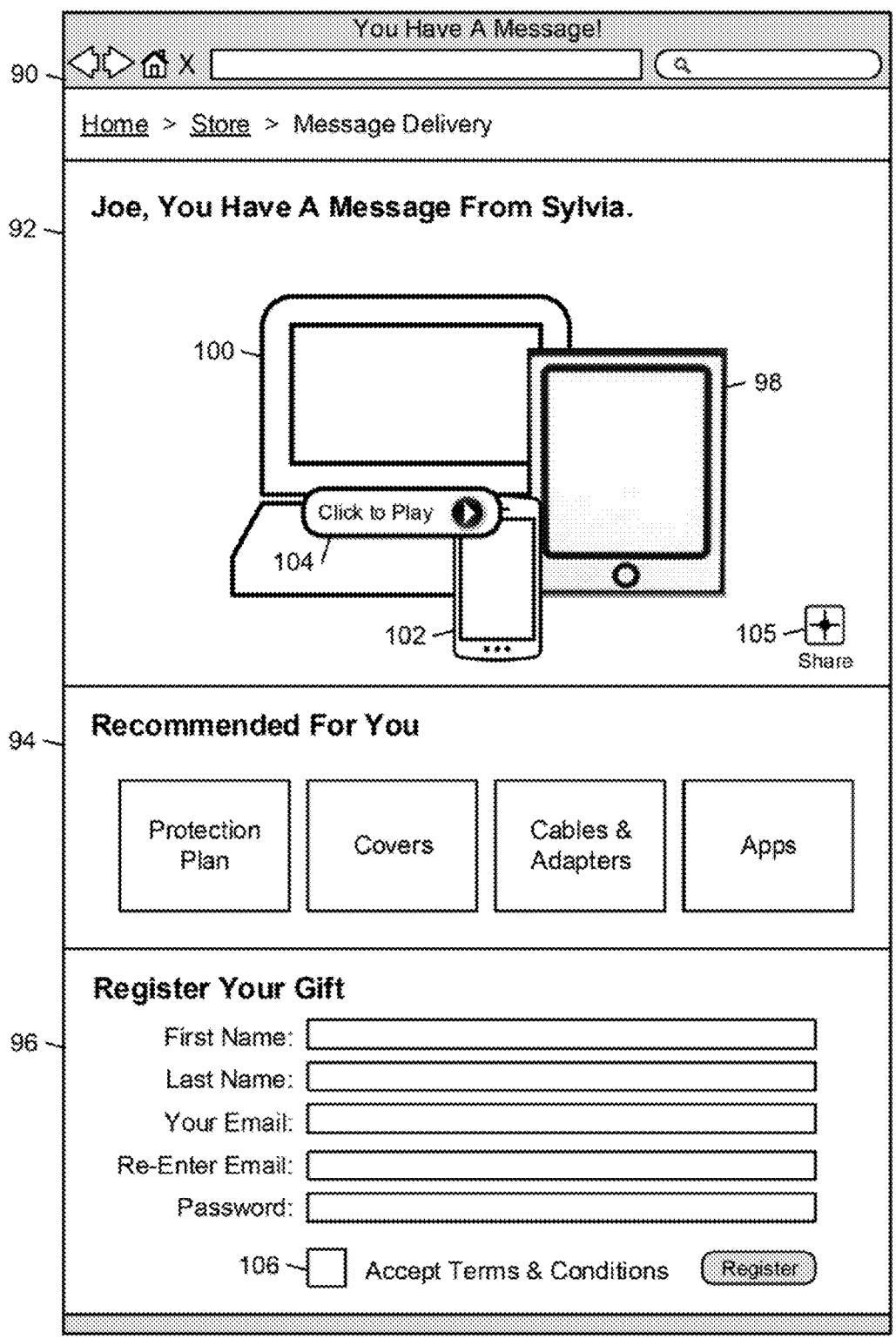
FIG. 12 is a diagrammatic view of an example of a network resource presenting a user interface for providing a gift message and obtaining customer acquisition information from a gift recipient.

FIG. 12 shows an example of a message presentation page 90 for presenting a gift message and auxiliary customer acquisition information to the gift recipient 34. In the illustrated example, the message presentation page 90 includes a message section 92 for presenting the gift message to the gift recipient 34, a promotions section 94 for presenting promotions and cross-selling recommendations to the gift recipient 34, and a registration section 96 that enables the gift recipient 34 to register the gift with the gifting system 30.

The message section 92 includes a background that shows an image of the gift 98 (i.e., a tablet computer) and several related or complementary products (e.g., a laptop computer 100 and a mobile telephone 102) that the customer acquisition management service 40 has identified as being potentially effective in attracting the interest of the gift recipient 34 based on, for example, attributes of the purchased gift, the gift giver, the gift recipient, and other information (see FIG. 2). The message section 92 also includes a playback control 104 for presenting the gift message to the gift recipient. The gift message may include, for example, one or more of textual content, audio content, and image content (e.g., still images and video images). The gift message may be presented in a variety of different ways including, for example, in the message section 92, in a separate pop-put window superimposed on the message presentation page 90, or on another page. The message section 92 includes a "Share" button 105 that allows the gift recipient 34 to instruct the gifting system 30 to post the gift message to an account of the gift recipient 34 with a social networking service (e.g., Facebook, Google+, tumblr, and Twitter).

The promotions section 94 includes a list of promotions and cross-selling recommendations that the customer acquisition management service 40 (see FIG. 2) has identified as being potentially effective in attracting the interest of the gift recipient 34 based on, for example, attributes of the purchased gift, the gift giver, the gift recipient, and other information. In the illustrated example, the promotions section 94 includes the following recommendations: a protection plan for the tablet computer, covers for the tablet computer, cables and adapters for the tablet computer, and applications (Apps) for the tablet computer.

The registration section 96 includes a registration form for registering the gift in exchange for receiving certain benefits (e.g., product warranty and support service coverage for the gift). The registration form prompts the gift recipient 34 to enter name, email address, and password information. The registration section 96 also includes a "Register" button that allows the gift recipient 34 to submit the entered form information, including the terms of service acceptance acknowledgement, to the gifting system 30. In this example, before submitting the registration information, the gift recipient 34 may indicate acceptance of certain contract terms (e.g., terms and conditions for the use of the services of the gifting system 30) by checking a checkbox 106. In some examples, the contract terms include provisions relating to the gift (e.g., provisions relating to returning or exchanging the gift and warrantying the gift) and the use of the gift recipient's personal data (e.g., provisions allowing the gifting system 30 to use the gift recipient's personal data for direct marketing purposes).

In the example shown in FIG. 12, the message delivery control 104 and the marketing opt-in control 106 that are associated with an indication that the gift message is available ("Click to Play") without revealing contents of the gift message.

Figure 13:
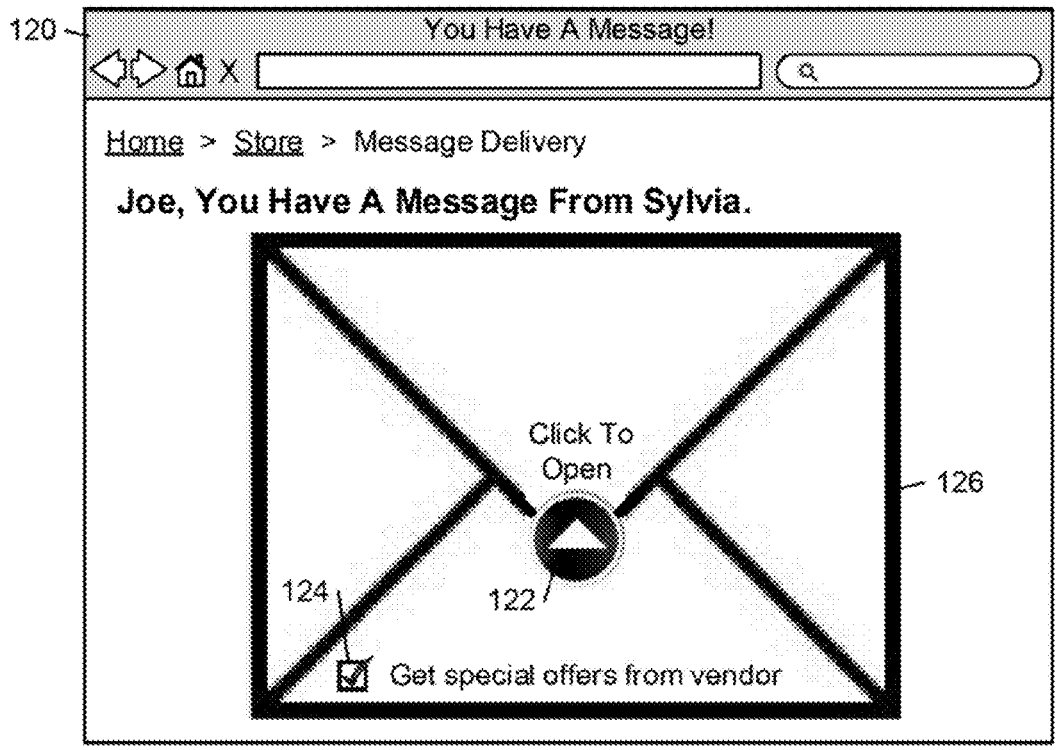
FIG. 13 is a diagrammatic view of an example of a network resource presenting a user interface for providing a gift message and obtaining customer acquisition information from a gift recipient.

FIG. 13 shows another example 120 of a network resource presenting a message notification interface that includes a message delivery control 122 and a marketing opt-in control 124 that are associated with an indication that the gift message is available ("Click to Open") without revealing contents of the gift message. In this example, the indication of the availability of the gift message includes an image 126 over which are superimposed the message delivery control 122 and the marketing opt-in control 124. The image 126 depicts an envelope and the message delivery control is presented to metaphorically suggest that selection of the message delivery control opens the envelope to reveal the gift message. In this example, the selection of the message delivery control 122 triggers both the presentation of the gift message to the client network node and the generation of a marketing preference record of the preference regarding receipt of direct marketing communications indicated by the marketing opt-in control 124.

Figure 14:
FIG. 14 is a diagrammatic view of an example of a network resource presenting a user interface for providing a gift message and obtaining customer acquisition information from a gift recipient.

FIG. 14 shows another example 130 of a network resource presenting a message notification interface that includes a message delivery control 132 and a marketing opt-in control 134. In this example, the gift message is a video, and the indication that the gift message is available is the opening frame of the video over which are superimposed the message delivery control 132 and the marketing opt-in control 124. In this example, the selection of the message delivery control 132 triggers both the presentation of the gift message to the client network node and the generation of a marketing preference record of the preference regarding receipt of direct marketing communications indicated by the marketing opt-in control 134.

Figure 15:
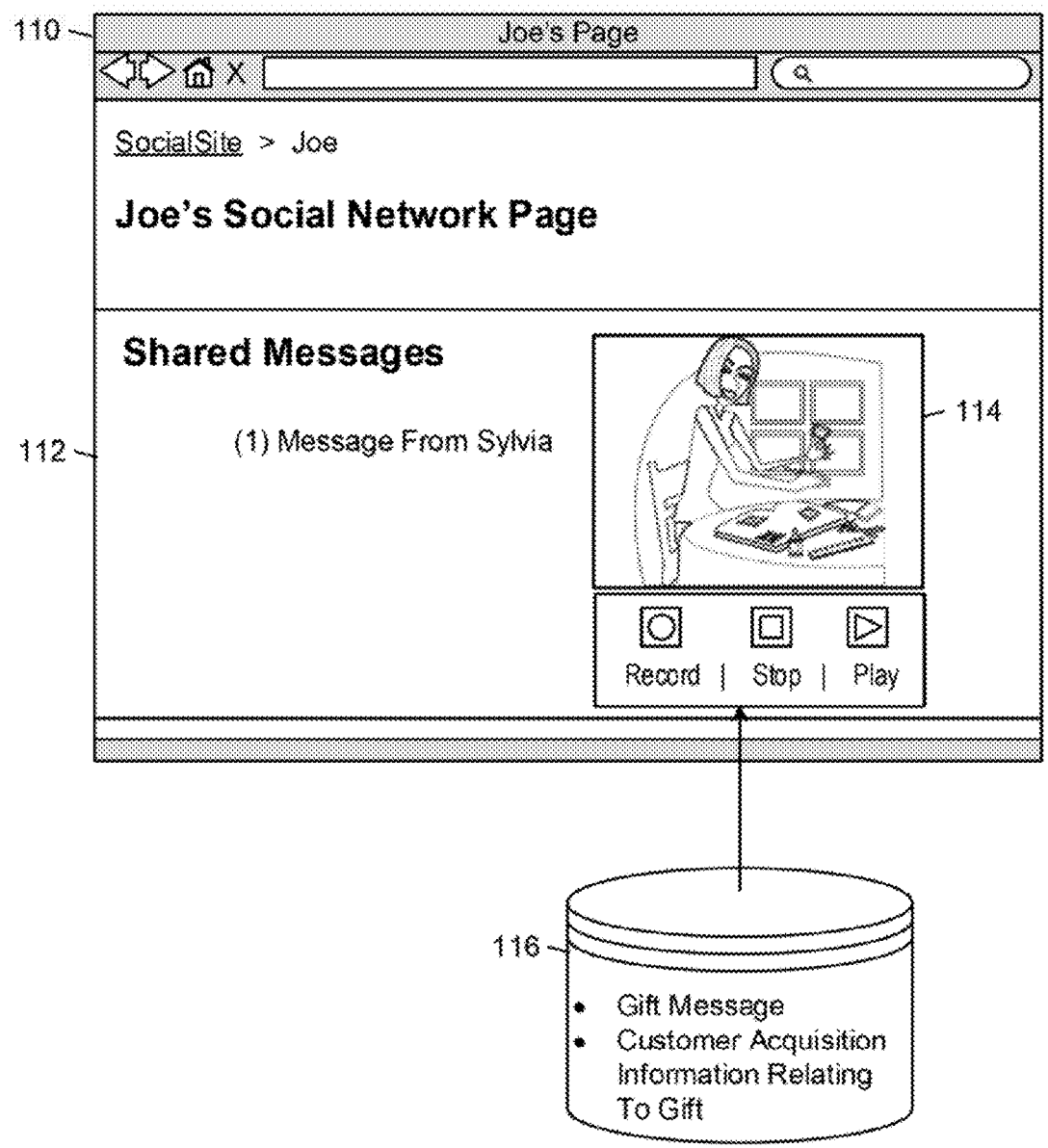
FIG. 15 is a diagrammatic view of an example of a gift recipient's social network web page that includes a section for sharing a gift message received by the gift recipient.

FIG. 15 shows an example of a gift recipient's social network web page 110 that includes a section 112 for sharing messages with other members of the social networking service. These messages include messages created by the gift recipient 34 on the social network web page 110, and messages posted to the gift recipient's social network page 110. Among the posted messages is a copy 114 of the gift message that was posted to the gift recipient's web page 110 by the gifting system 30 in response to the gift recipient's selection of the "Share" button 105 in the message section 92 of the message presentation page 90 shown in FIG. 12. In this regard, in response to selection of the "Share" button 105, the gifting system 30 transmits to the social networking service a message package 116 that includes the gift message along with auxiliary customer acquisition information that is identified by the customer acquisition management service 40 (see FIG. 2) as being potentially effective in attracting the interest of members of the social networking service who are likely to view the message. In some examples, the auxiliary customer acquisition information includes promotions and other customer acquisition information relating to the gift itself, as opposed to marketing information relating to products and services identified as being related to or complementary to the gift (e.g., the marketing information that is presented to the gift recipient 34 on the message presentation page 90).

IV. Conclusion

The examples that are described herein provide systems and methods for gift messaging based customer acquisition. These embodiments solve the problems involved in directing effective customer acquisition efforts to a gift recipient in a cost effective way by leveraging a gift recipient's desire to receive a personalized gift message from an existing customer (i.e., the gift giver) to incentivize the gift recipient to receive those customer acquisition efforts.

Other embodiments are within the scope of the claims.

The invention claimed is:

1. A computer-implemented method, comprising:
by a server network node receiving, from a client network node associated with a gift recipient, a request to access a gift message associated with a gift purchased from a vendor by a product purchaser for the gift recipient in connection with a purchase transaction, wherein the request comprises tracking information that associates the purchase transaction with the gift message;

based on receipt of the request to access the gift message, extracting, by the server network node, the tracking information from the request, identifying the gift message based on the extracted tracking information, and transmitting to the client network node a network resource comprising a message delivery control to access the identified gift message and a marketing opt-in control to indicate a preference regarding receipt of direct marketing communications, wherein the network resource comprises a web page interface that concurrently presents on the client network node both a graphical representation of the message delivery control and a graphical representation of the marketing opt-in control superimposed on a graphical representation of the gift message;

by the server network node, in connection with the graphical representation of the marketing opt-in control, receiving from the client network node a user selection of an opt-in preference regarding receipt of direct marketing communications by the gift recipient;

by the server network node, in response to receipt of the selection of the opt-in preference, modifying the graphical representation of the opt-in control on the web page interface to graphically indicate that the opt-in preference regarding receipt of direct marketing communications has been selected; and by the server network node, in response to receipt of a user selection of the message delivery control from the client network node, triggering both a transmission of the gift message to the client network node and a generation of a marketing preference record comprising an indication of the selection of the opt-in preference received from the client network node and information evidencing the selection of the opt-in preference by the gift recipient.

2. The method of claim 1, further comprising determining information about the purchase transaction from the request to access the gift message, and customizing the network resource based on the purchase transaction information.

3. The method of claim 2, wherein the customizing comprises incorporating into the network resource marketing communications selected based on the purchase transaction information.

4. The method of claim 1, wherein the message delivery control and the marketing opt-in control are associated with an indication that the gift message is available without revealing contents of the gift message.

5. The method of claim 4, wherein the indication that the gift message is available comprises an image over which are superimposed the message delivery control and the marketing opt-in control.

6. The method of claim 5, wherein the image depicts an envelope and the message delivery control is presented to metaphorically suggest that selection of the message delivery control opens the envelope to reveal the gift message.

7. The method of claim 5, wherein the gift message is a video, and the image is a frame of the video.

8. The method of claim 1, wherein the information evidencing the selection of the opt-in preference by the gift recipient comprises one or more of a messaging address associated with the gift recipient, an indication of when the selection of the opt-in preference was made, and information about a network session between the at least one server network node and the client node during the presenting of the gift message to the client network node.

9. A server network node comprising a memory storing processor-readable instructions, and a processor coupled to the memory and operable to execute the instructions, wherein based at least in part on the execution of the instructions the server network node is operable to perform operations comprising:
- from a client network node associated with a gift recipient, receiving a request to access a gift message associated with a gift purchased from a vendor by a product purchaser for the gift recipient in connection with a purchase transaction, wherein the request comprises tracking information that associates the purchase transaction with the gift message;
- based on receipt of the request to access the gift message, extracting the tracking information from the request, identifying the gift message based on the extracted tracking information, and transmitting to the client network node a network resource comprising a message delivery control to access the identified gift message and a marketing opt-in control to indicate a preference regarding receipt of direct marketing communications, wherein the network resource comprises a web page interface that concurrently presents on the client network node both a graphical representation of the message delivery control and a graphical representation of the marketing opt-in control superimposed on a graphical representation of the gift message;
- in connection with the graphical representation of the marketing opt-in control, receiving from the client network node a user selection of an opt-in preference regarding receipt of direct marketing communications by the gift recipient;
- in response to receipt of the selection of the opt-in preference, modifying the graphical representation of the opt-in control on the web page interface to graphically indicate that the opt-in preference regarding receipt of direct marketing communications has been selected; and
- in response to receipt of a user selection of the message delivery control from the client network node, triggering both a transmission of the gift message to the client network node and a generation of a marketing preference record comprising an indication of the selection of the opt-in preference received from the client network node and information evidencing the selection of the opt-in preference by the gift recipient.

10. At least one non-transitory computer readable medium comprising instructions, which when executed by a server network node, cause the server network node to perform operations comprising:
- from a client network node associated with a gift recipient, receiving a request to access a gift message associated with a gift purchased from a vendor by a product purchaser for the gift recipient in connection with a purchase transaction, wherein the request comprises tracking information that associates the purchase transaction with the gift message;
- based on receipt of the request to access the gift message, extracting the tracking information from the request, identifying the gift message based on the extracted tracking information, and transmitting to the client network node a network resource comprising a message delivery control to access the identified gift message and a marketing opt-in control to indicate a preference regarding receipt of direct marketing communications, wherein the network resource comprises a web page interface that concurrently presents on the client network node both a graphical representation of the message delivery control and a graphical representation of the marketing opt-in control superimposed on a graphical representation of the gift message;
- in connection with the graphical representation of the marketing opt-in control, receiving from the client network node a user selection of an opt-in preference regarding receipt of direct marketing communications by the gift recipient;
- in response to receipt of the selection of the opt-in preference, modifying the graphical representation of the opt-in control on the web page interface to graphically indicate that the opt-in preference regarding receipt of direct marketing communications has been selected; and
- in response to receipt of a user selection of the message delivery control from the client network node, triggering both a transmission of the gift message to the client network node and a generation of a marketing preference record comprising an indication of the selection of the opt-in preference received from the client network node and information evidencing the selection of the opt-in preference by the gift recipient.

* * * * *